US006644141B2

(12) United States Patent
Oikarinen

(10) Patent No.: US 6,644,141 B2
(45) Date of Patent: Nov. 11, 2003

(54) ARRANGEMENT IN CONNECTION WITH CONTROL DEVICE

(75) Inventor: Timo Oikarinen, Kajaani (FI)

(73) Assignee: Ponsse OYG, Vierema (FI)

(*) Notice: Subject to any disclaimer, the term of this patent is extended or adjusted under 35 U.S.C. 154(b) by 0 days.

(21) Appl. No.: 10/178,763

(22) Filed: Jun. 25, 2002

(65) Prior Publication Data

US 2003/0010611 A1 Jan. 16, 2003

Related U.S. Application Data

(63) Continuation of application No. PCT/FI01/00032, filed on Jan. 15, 2001.

(30) Foreign Application Priority Data

Jan. 17, 2000 (FI) .......................................... 200000086

(51) Int. Cl.[7] ................................................ B60K 20/00

(52) U.S. Cl. .............. 74/471 XY; 200/6 A; 273/148 R; 188/333; 74/523

(58) Field of Search ....................... 74/471 XY, 473.12, 74/479.01, 491, 504, 523; 273/148 R, 143 B; 414/685, 694; 188/315, 333; 200/6 A

(56) References Cited

U.S. PATENT DOCUMENTS

| | | | | | |
|---|---|---|---|---|---|
| 3,705,519 | A | * | 12/1972 | Sjoo | 74/471 XY |
| 3,779,095 | A | | 12/1973 | Audet | |
| 4,103,559 | A | * | 8/1978 | Kohler | 74/471 XY |
| 4,280,027 | A | * | 7/1981 | Comerford et al. | 200/6 A |
| 4,406,931 | A | * | 9/1983 | Dola | 200/6 A |
| 4,574,651 | A | * | 3/1986 | Nordstrom | 74/471 XY |
| 4,738,417 | A | * | 4/1988 | Wenger | 74/471 XY |
| 5,042,314 | A | * | 8/1991 | Rytter et al. | 74/523 X |
| 5,421,694 | A | * | 6/1995 | Baker et al. | 414/694 |
| 5,647,247 | A | * | 7/1997 | Magrini | 74/471 XY |
| 5,875,682 | A | | 3/1999 | Smith | |
| 5,945,646 | A | * | 8/1999 | Miller et al. | 200/6 A |
| 5,969,520 | A | * | 10/1999 | Schottler | 74/471 XY |
| 6,344,620 | B1 | * | 2/2002 | Nakamura | 200/6 A |

FOREIGN PATENT DOCUMENTS

| | | | |
|---|---|---|---|
| DE | 31 02 258 A1 | | 10/1982 |
| EP | 0 095 763 A2 | | 12/1983 |
| FI | 820556 | | 8/1983 |
| IT | 426313 | * | 10/1947 |
| SE | 512 104 | | 7/1910 |
| SE | 510 786 | | 12/1997 |

* cited by examiner

*Primary Examiner*—David A. Bucci
*Assistant Examiner*—Colby Hansen
(74) *Attorney, Agent, or Firm*—Young & Thompson

(57) ABSTRACT

The present invention relates to an arrangement in connection with a control device (1) particularly used for controlling a forestry machine and a boom thereof. The control device comprises a frame section (5), a handle (2) attached pivotally thereto, operating switches (3) at the handle and a control keyboard (4) arranged in connection with the handle onto a supporting plate (8) surrounding the handle. The present invention enables a driver to reach all control keys (9) of the control device at all operating positions of the control device. Thus the supporting plate comprises a dome-shaped element having, for example, spherical outer surface (10) and being arranged in connection with the handle (2). The control keyboard (4) is arranged on the outer surface of this element.

12 Claims, 2 Drawing Sheets

ARRANGEMENT IN CONNECTION WITH CONTROL DEVICE

This is a Continuation of co-pending International application No. PCT/FI01/00032, filed on Jan. 15, 2001, which designated the United States of America.

FIELD OF THE INVENTION

The invention relates to a control device arrangement according to claim 1. Such a device is used, for example, for controlling functions of a working machine, particularly a forestry machine.

BACKGROUND OF THE INVENTION

Lever-shaped devices are widely used for controlling functions of current working machines. In the following, they are called control devices. By moving such a control device, some of the main functions of a working machine, such as movements of a working boom of a forestry machine, are thus controlled. In addition to the control device, other important functions of the working machine, such as controlling telescopic, out- and inwards directed movements of a boom of a forestry machine, are often connected to push buttons at the handle of the control device. Two kinds of control devices are used in forestry machines. The more common control device is long, has a large range of movement and can also be compared with a joystick used in computer games and planes. Such a control device is moved by using the entire hand and forearm. However, this has often been noticed to cause too much tension in shoulders, wherefore 'minilevers' have become more common. The range of movement of these considerably small control devices is so small that the control devices can be used by moving fingers and the wrist, whereas the arm of the working machine driver rests mainly against the armrest of the seat. Thus, the structure of the control device must be both small and light.

In the most advanced working machines, such as chippers, the controls performed by the handle of the control device and the operating switches at the handle are not sufficient for carrying out all functions and choices of the machine. In addition, also an independent small keyboard is required, which is close to the control device. Usually such a keyboard is positioned so that it can be used by fingertips of the hand moving the control device.

Since the controlling of a working machine demands great accuracy, much attention should be paid to the ergonomics of such control means. Although the range of movement of the control device is made as small as possible, the problem which arises when using a keyboard in connection with such a control device is how the fingers of the driver controlling the working machine are made to reach to all keys at all operating positions of the control device. One common way to solve the problem caused by the structure of long control devices as control means is that the keyboard is fixed to the same armrest of the seat in the working machine as the control device itself. Thereby it is almost impossible to use all keys at all extreme positions of the control range efficiently. Another commonly used solution is to fix the keyboard to the handle of the control device. This requires, however, that a relatively heavy control device with a large range of movement is used, which causes that it is cumbersome to use the handle and that the handle is heavy. Therefore, when a small control device is used, it has to be made small and light. However, it has not been possible to arrange keys at the handle in the similar manner as in long control devices.

BRIEF DESCRIPTION OF THE INVENTION

It is an object of the present invention to substantially reduce prior art problems and provide a new type of solution which facilitates the use of control means considerably. The object is achieved such that the arrangement has the characteristic features defined in the claims according to the present invention. More specifically, the arrangement according to the present invention is chiefly characterized by what is said in the characterizing part of claim 1.

The arrangement according to a preferred embodiment of the invention, whereby a supporting plate supporting the keyboard is arranged in connection with the handle, enables the movements of the control device and those of the keyboard in connection with it to be connected to each other such that when the control device is moved, this does not considerably hinder the user from reaching and pressing the keys. The supporting plate attached to the handle of the control device follows the movements of the handle easily. On the other hand, the supporting plate according to the invention forms a structure which surrounds the handle from all sides, and thus the weight of the supporting plate and keyboard does not disturb the balance of the handle. Consequently, springs that control movements of the handle need not be made particularly stiff, which improves the ergonomics and controllability of the control device.

The keys that are on the supporting plate in connection with the handle of the control device can be easily reached by fingers. The supporting plate can also be constructed such that it extends past the armrest supporting the control device and covers up all the mechanical parts of the control device.

The preferred embodiments of the invention are disclosed in the dependent claims.

Thus, in a specific embodiment of the invention the structure of current small 'minilevers' is taken into account such that the supporting plate is not fixed to the handle at all, but it is arranged at the frame section of the control device in a sliding manner. Thus, the handle pushes the supporting plate ahead of it along bearing surfaces, and the stress applied to the handle remains as weak as possible.

On the other hand, the structure can be understood as an integration of the supporting plate and the handle, which is simple to manufacture and operates reliably.

BRIEF DESCRIPTION OF THE DRAWINGS

In the following the invention will be described in greater detail by means of the attached drawings, in which.

DETAILED DESCRIPTION OF THE INVENTION

Figure 1:
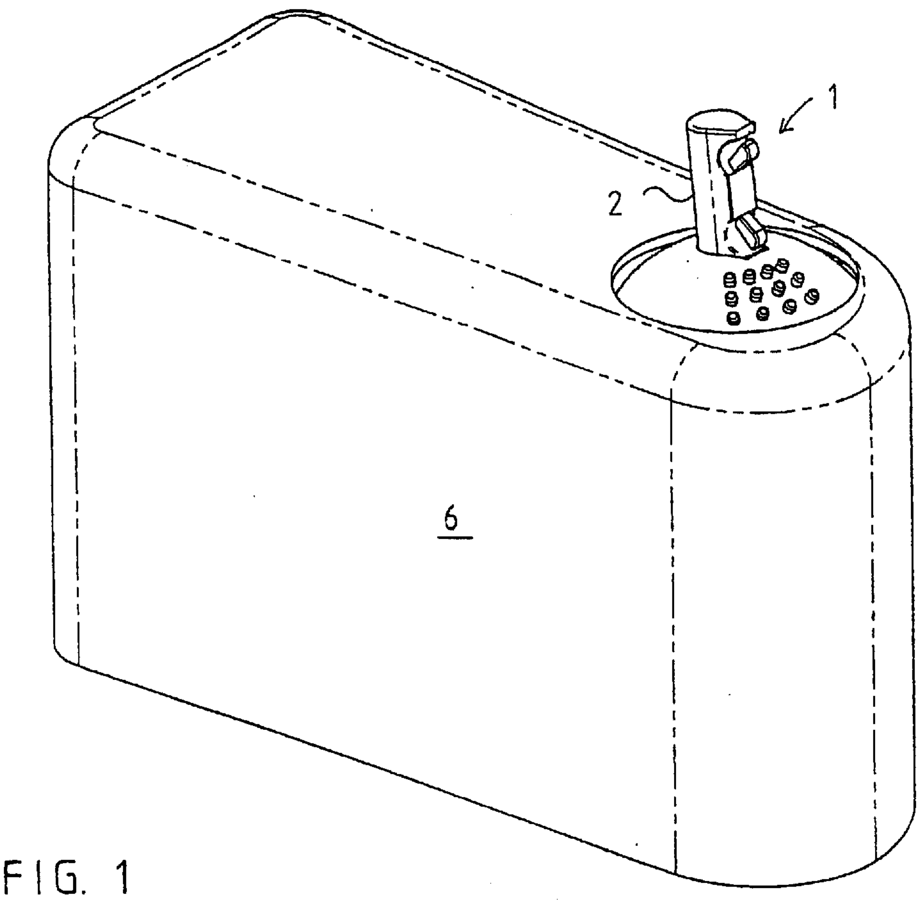
FIG. 1 shows a control device according to the invention, arranged at an armrest of a driver's seat.
Figure 2:
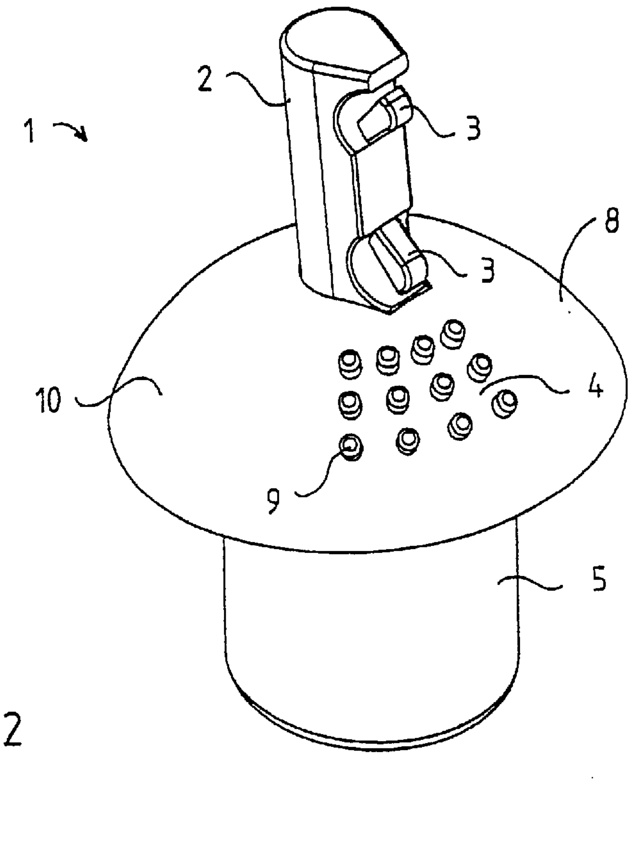
FIG. 2 is an axonometric view of the control device of FIG. 1 on a larger scale.
Figure 3:
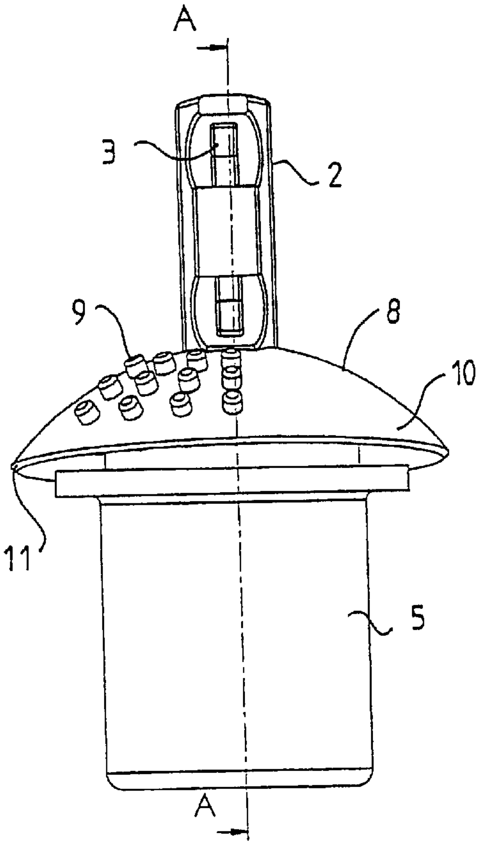
FIG. 3 is a front view of the control device of FIG. 1.

The figures show a control device 1 to which the invention relates. Such a control device comprises a handle 2 attached to a working machine (not shown), operating switches 3 at the handle and a control keyboard 4. The handle is preferably fixed by means of a frame section 5 to an armrest 6 of the seat in the working machine. The handle is thus arranged to be joined to and moved in respect of the frame section by means of a hinge arrangement 7 in accordance with FIG. 4, for instance. The handle can also be arranged in a manner known per se to move along a spherical cap surface at the joint. The control keyboard, for its part, is fixed onto a supporting plate 8 at a suitable working distance from the handle in a manner known per se. Such a supporting plate is arranged to surround the handle from its all sides, the supporting plate thus forming a natural supporting surface for the hand of the person using the control device. In this case the supporting plate is usually arranged into proximity of the joint between the frame section and the handle such that the handle and/or the frame section extend/s vertically through an opening in the supporting plate which is fixed to the handle either directly or by means of fixing means.

Figure 4:
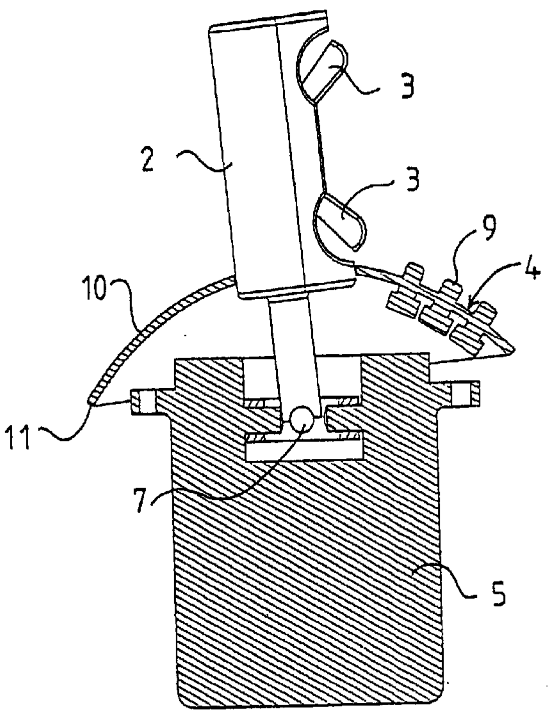
FIG. 4 is a vertical section taken along the line A—A of the arrangement in FIG. 3.

In the embodiment of FIG. 4, the control keyboard 4 is preferably mounted substantially fixedly onto the supporting plate 8 in connection with the handle 2 of the control device. Thus, every movement of the handle is directly transmitted to the supporting plate, guiding the control keyboard into a position that is advantageous to the driver. Microswitches on the outer surface 10 of a dome-shaped element formed by the supporting plate are intended to be used as control keys 9. When the supporting plate is arranged according to the invention to be moved by means of the handle only a little to each direction, the control keys are forced to follow the movements of the handle. However, the control keys on the dome-shaped supporting plate surface according to the invention can be easily reached by fingers. By choosing, for example, a plastic material or a light alloy as a manufacturing material such a supporting plate with its control keyboard can also be made so light that it does not disturb the balance of the handle. Further, since the supporting plate surrounds the handle of the control device 1 from its every side, the weight of the supporting plate does not disturb the balance of the handle in any way when the handle is used. Because of the shape of the supporting plate, which preferably extends towards the armrest 6 of the seat supporting the frame section 5, the driver can also press the supporting plate with the wrist during the control movement and thus improve the accuracy of the control.

Figure 5:
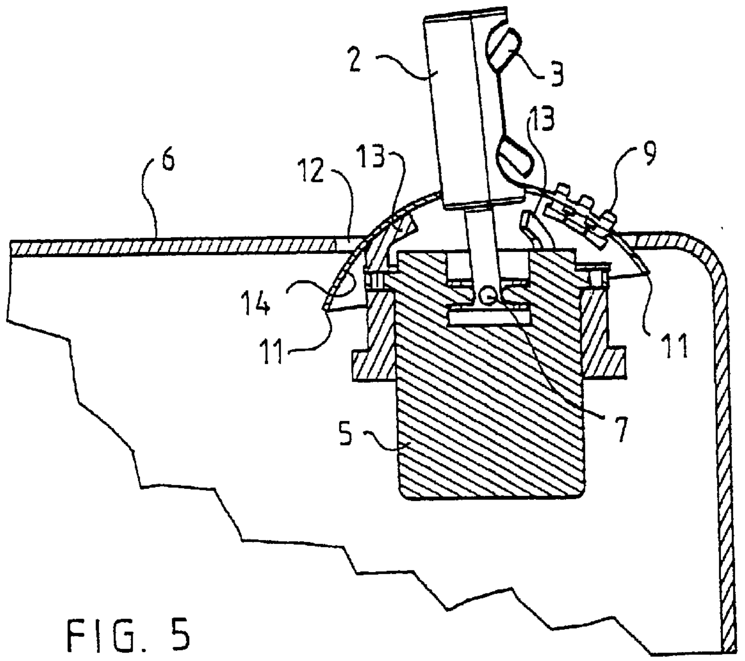
FIG. 5 is a vertical section of an alternative embodiment, taken along the line A—A of the arrangement in FIG. 3 and arranged at the armrest.

The outer edges 11 of the dome-shaped supporting plate 8 of the invention can also be extended as far as to the armrest 6, as in FIG. 1 or 5. The supporting plate is preferably extended inside the armrest from an opening 12 arranged to receive the control device 1. This way, all mechanical hinge arrangements, springs and other parts of the control device can be fitted under the supporting plate to be protected from outside contact.

The supporting plate 8 of the invention preferably comprises a rotationally symmetrical element. Such an element is thus arranged substantially symmetrically in respect of the handle 2, and the control keyboard 4 on the supporting plate is mounted onto the outer surface 10 of the element. In order to reduce the weight of the supporting plate it is preferably formed as a sheet-like element shaped like a spherical cap, the element being arranged in connection with the handle in proximity of the frame section 5 of the control device 1.

In the embodiment according to FIG. 5, the supporting plate is arranged to surround the handle freely without being attached thereto in any way. So, when the handle is moved, it comes into contact with the supporting plate and the movements of the handle are transmitted to the supporting plate. The movements of the supporting plate are then arranged to be controlled preferably by bearing means 13 which are fixed to the frame section 5 of the control device. Such bearing means can be sliding surfaces or ball bearings known per se. In such a case, the inner surface 14 of the supporting plate or guide surfaces formed thereto are arranged to receive the bearing means and guide the movements of the supporting plate when the handle pushes the supporting plate at the edge of the hole in the joint between the handle and the supporting plate. In order to adapt the movements to the movements of the handle as well as possible, the inner surface or the guide surfaces are arranged to be parallel to the outer surface 10 of the supporting plate.

It is to be understood that the above description and the related drawings are only intended to illustrate the present invention. Consequently, the invention is not restricted only to the embodiment which is described above or defined in the claims, but it is obvious to persons skilled in the art that many variations and modifications of the invention are possible within the scope of the inventive idea disclosed in the attached claims.

I claim:

1. An arrangement in connection with a control device (1) and to be used particularly for controlling a working machine, the control device comprising a frame section (5), a handle (2) attached pivotally thereto, operating switches (3) at the handle and a control keyboard (4) arranged in connection with the handle, whereby the control keyboard is arranged to be directed away from the handle onto a supporting plate (8) surrounding the handle, the supporting plate being arranged to move according to the movements of the handle (2), the supporting plate comprising an element arranged in connection with the handle, the element having a dome-shaped outer surface (10) and opening towards the frame section (5) of the control device (1), whereby the control keyboard (4) is arranged at the outer surface of the element.

2. An arrangement as claimed in claim 1, wherein the supporting plate (8) is arranged to be slid in respect of the frame section (5) along bearing means (13) extending to the supporting plate.

3. An arrangement as claimed in claim 2, wherein the bearing means (13) comprise a sliding surface arranged substantially fixedly at the frame section (5).

4. An arrangement as claimed in claim 2, wherein the bearing means (13) comprise a ball bearing arranged substantially fixedly at the frame section (5).

5. An arrangement as claimed in claim 2, wherein the bearing means (13) are arranged to be in connection with the inner surface (14) of the supporting plate (8) when the handle is arranged to guide the supporting plate along the bearing means.

6. An arrangement as claimed in claim 2, wherein the inner surface (14) of the supporting plate (8) is arranged to be substantially parallel to the outer surface (10) of the supporting plate.

7. An arrangement as claimed in claim 2, wherein the supporting plate (8) is arranged to extend as far as to an armrest (6) surrounding the frame section (5) of the control device (1).

8. An arrangement as claimed in claim 1, wherein the supporting plate (8) is a rotationally symmetrical sheet-like element arranged symmetrically in respect of the handle (2).

9. An arrangement as claimed in claim 1, wherein the supporting plate (8) has the shape of a spherical cap.

10. An arrangement as claimed in claim 1, wherein the supporting plate (8) is made of a plastic material.

11. An arrangement as claimed in claim 1, wherein the supporting plate (8) is made of a light alloy.

12. An arrangement as claimed in claim 1, wherein the control keyboard (4) comprises microswitches.

* * * * *

UNITED STATES PATENT AND TRADEMARK OFFICE

CERTIFICATE OF CORRECTION

PATENT NO. : 6,644,141 B2
DATED : November 11, 2003
INVENTOR(S) : Oikarinen

It is certified that error appears in the above-identified patent and that said Letters Patent is hereby corrected as shown below:

Title page,
Item [73], Assignee, "Ponsse OYG" should be -- Ponsse Oyj --.
Item [30], "200000086" should be -- 20000086 --.

Signed and Sealed this

Sixteenth Day of March, 2004

JON W. DUDAS
*Acting Director of the United States Patent and Trademark Office*